(12) United States Patent
Yamamoto

(10) Patent No.: US 11,547,108 B1
(45) Date of Patent: Jan. 10, 2023

(54) FIELD INCINERATOR

(71) Applicant: Jiro Yamamoto, Gardena, CA (US)

(72) Inventor: Jiro Yamamoto, Gardena, CA (US)

( * ) Notice: Subject to any disclaimer, the term of this patent is extended or adjusted under 35 U.S.C. 154(b) by 0 days.

(21) Appl. No.: 17/744,987

(22) Filed: May 16, 2022

(51) Int. Cl.
*A01M 15/00* (2006.01)
*A01M 21/04* (2006.01)
*F23D 14/56* (2006.01)
*F23G 7/10* (2006.01)
*F23G 5/40* (2006.01)

(52) U.S. Cl.
CPC ............ *A01M 15/00* (2013.01); *A01M 21/04* (2013.01); *F23D 14/56* (2013.01); *F23G 5/40* (2013.01); *F23G 7/10* (2013.01)

(58) Field of Classification Search
CPC .............................. A01M 15/00; A01M 21/04
See application file for complete search history.

(56) References Cited

U.S. PATENT DOCUMENTS

| | | | | |
|---|---|---|---|---|
| 1,799,035 A | * | 3/1931 | Benien ................... | F23D 91/02 56/12.2 |
| 2,523,953 A | * | 9/1950 | Johnson ................ | A01M 15/00 126/271.2 |
| 2,694,393 A | * | 11/1954 | Simpson ............... | A01M 15/00 126/271.2 |
| 4,688,494 A | * | 8/1987 | Domnitch ................ | F23G 5/14 110/240 |
| 10,136,632 B2 | | 11/2018 | Yamamoto | |
| 2008/0072479 A1 | * | 3/2008 | Pivonka ................ | G05D 16/20 137/509 |
| 2017/0328563 A1 | * | 11/2017 | Yamamoto ............. | F23D 14/56 |
| 2020/0120886 A1 | * | 4/2020 | Geltner ................. | B25J 9/1697 |

FOREIGN PATENT DOCUMENTS

EP 3425618 1/2019

* cited by examiner

*Primary Examiner* — Christopher D Hutchens
*Assistant Examiner* — Steven J Shur
(74) *Attorney, Agent, or Firm* — Clement Cheng

(57) ABSTRACT

A field incinerator has a carriage with a frame. A fuel tank such as a propane tank is mounted to the frame. An outlet passage extends from the tank. An outlet valve is mounted to the outlet passage. The outlet valve controls the outlet passage. The first gauge has a first gauge tap. The first gauge tap is connected to the fuel tank or the outlet passage. The first gauge has a first gauge control parameter. The first gauge control parameter requires less than a first set pressure for activation. The second gauge is connected to the outlet passage downstream from the first gauge. The second gauge has a second gauge control parameter. The second gauge control parameter requires more than a set second pressure for activation. The first gauge control parameter and the second gauge control parameter must both be fulfilled for opening the outlet valve.

20 Claims, 4 Drawing Sheets

FIELD INCINERATOR

FIELD OF THE INVENTION

The present invention is in the field of field incinerators.

DISCUSSION OF RELATED ART

Field incinerators are commonly used for scorching earth before planting seeds.

SUMMARY OF THE INVENTION

A field incinerator has a carriage with a frame. A fuel tank such as a propane tank is mounted to the frame. An outlet passage extends from the tank. An outlet valve is mounted to the outlet passage. The outlet valve controls the outlet passage. The first gauge has a first gauge tap. The first gauge tap is connected to the fuel tank or the outlet passage. The first gauge has a first gauge control parameter. The first gauge control parameter requires less than a first set pressure for activation. The second gauge is connected to the outlet passage downstream from the first gauge a set distance away from the first gauge. The second gauge has a second gauge control parameter. The second gauge control parameter requires more than a set second pressure for activation. The first gauge control parameter and the second gauge control parameter must both be fulfilled for opening the outlet valve.

The third gauge has a third gauge tap that is connected to the outlet passage downstream from the second gauge. The third gauge has a third gauge control parameter. The third gauge control parameter requires less than a set third set pressure for activating the flame control valve. A burner is connected to the flame control valve. The burner is configured in series with the flame control valve which is in series with the third gauge, outlet valve, second gauge, first gauge, and fuel tank. The fuel tank is preferably a propane tank with a propane tank manual on off valve before the automatically controlled outlet valve. The automatically controlled valve can be a solenoid valve. The propane tank manual on off valve can be a ball valve.

The field incinerator also preferably includes a main control circuit having a set of inputs and a set of outputs. The set of inputs includes a flame rod input. The field incinerator also preferably has a flame failure safety circuit with an alarm horn. An airflow switch is preferably configured as an airflow sensor for sensing an airflow of the blower. The set of outputs includes the valve open output. The set of inputs includes a valve open input. The valve open input controls the valve open output. Preferably, the set first pressure is between 4 and 6 psi, the set second pressure is between 2 and 3 psi, and the set third pressure is between 7 and 9 psi.

The following call out list of elements can be a useful guide in referencing the element numbers of the drawings.
21 Input
22 Output
23 First Preset Pressure
24 Second Preset Pressure
25 Third Preset Pressure
31 High-Voltage Side
32 Medium Voltage Ac Side
40 Power Supply
41 Main Disconnect
42 First Motor Power Circuit
43 Second Motor Power Circuit
44 Control Transformer
45 Neutral Side
46 Hot Side
47 Power Switch Circuit
48 Combustion Blower Circuit
49 Pump Power Circuit
50 Burner Control Circuit
51 Burner Switch
52 First Gas Pressure Switch
53 Second Gas Pressure Switch
54 Valve Open Input
55 Valve Open Output
56 Water Pump
57 Emergency Stop Switch
58 Combustion Blower
59 Combustion Blower Switch
60 Main Control Circuit
61 Flame Failure Safety Circuit
62 Main Gas Valve Control Circuit
63 Alarm Horn
64 Push To Silence Alarm
65 Flame Failure Sensor
66 Ignition Transformer
67 Closure Switch
68 Airflow Switch
69 Flame Rod
70 Outlet Valve
71 Propane Tank
72 First Gauge Tap
73 Second Gauge Tap
74 Third Gauge Tap
75 Flame Control Valve
76 Burner
77 Outlet
78 Screen
79 Outlet Passage Length
81 First Gauge
82 Second Gauge
83 Third Gauge
84 First Gauge Control Parameter
85 Second Gauge Control Parameter
86 Third Gauge Control Parameter
87 Outlet Passage
88 Burner Passage
89 Flame
90 Carriage
91 Front Wheel
92 Rear Wheel
93 Frame
94 Housing
95 Ground
96 Turf
97 Burner Enclosure
98 Main Control Circuit Housing
99 Second Carriage

DETAILED DESCRIPTION OF THE PREFERRED EMBODIMENT

The following glossary can be a useful reference for the abbreviations in the detailed description. PSI refers to pounds per square inch. NEMA refers to National Electrical Manufacturers Association which promulgates industry standards. NPT refers to national pipe thread.

Figure 3:
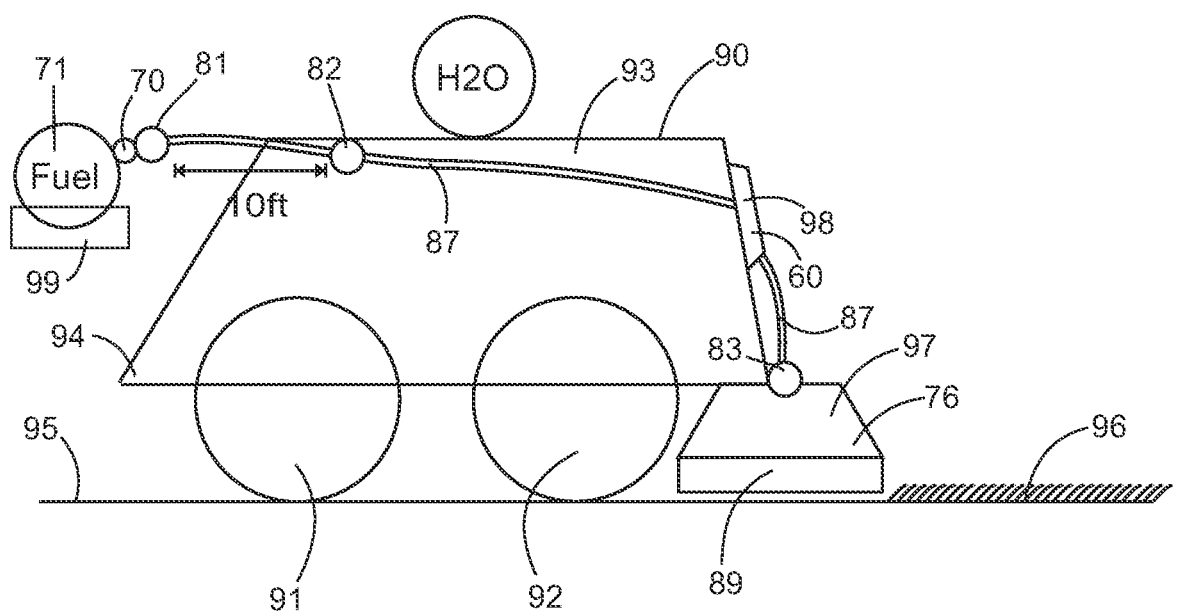
FIG. 3 is an external view diagram of the field incinerator.

As seen in FIG. 3, the field incinerator is shown as a vehicle formed as a carriage 90 that has at least a front wheel 91 and a rear wheel 92. The field incinerator has a frame 93 with a housing 94 covering the frame 93. The vehicle is formed as a carriage 90 that travels over ground 95. The ground 95 is often scorched before planting turf 96. The burner enclosure 97 encloses the flame 89. The burner enclosure 97 is mounted to the frame 93 and the wheels are mounted to the frame 93. The carriage 90 can operate in a forward or reverse direction. A fuel tank such as a propane tank 71 has an outlet valve 70 controlling propane flow through an outlet passage 87. The main control circuit housing 98 holds the main control circuit and the main control circuit controls valves that maintain proper pressure of the propane flow through the outlet passage 87. The propane flow travels from the propane tank 71 all the way to the burner enclosure 97 to be burned as flame 89.

As seen in FIG. 3, the first gauge 81 is connected at the outlet 70 after the propane tank or fuel tank 71. The second gauge 82 is connected in series with the first gauge 81 and in fluid flow with the first gauge 81. The distance between the first gauge 81 and the second gauge 82 is preferably at least a minimum distance of 10 feet. The fuel tank 71 can be mounted to a second carriage 99. The second carriage 99 can be a tractor or trailer pulled by a tractor, and the carriage 90 can be a trailer connected to the tractor. The fuel tank 71 can be mounted to the second carriage 99 or the first carriage, if the first carriage is long enough.

The burner can be mounted in front of the wheels or between the wheels of the carriage 90. The burner can be operated with a temperature of about 400 degrees Fahrenheit to 500 degrees Fahrenheit and if it is between eight and ten feet long, the preferred operation is at 2,000,000 BTUs or approximately 504,328 kilo calories. If the same burner is moving at 1-2 miles per hour, the exposed time is approximately two to four seconds.

Figure 1A:
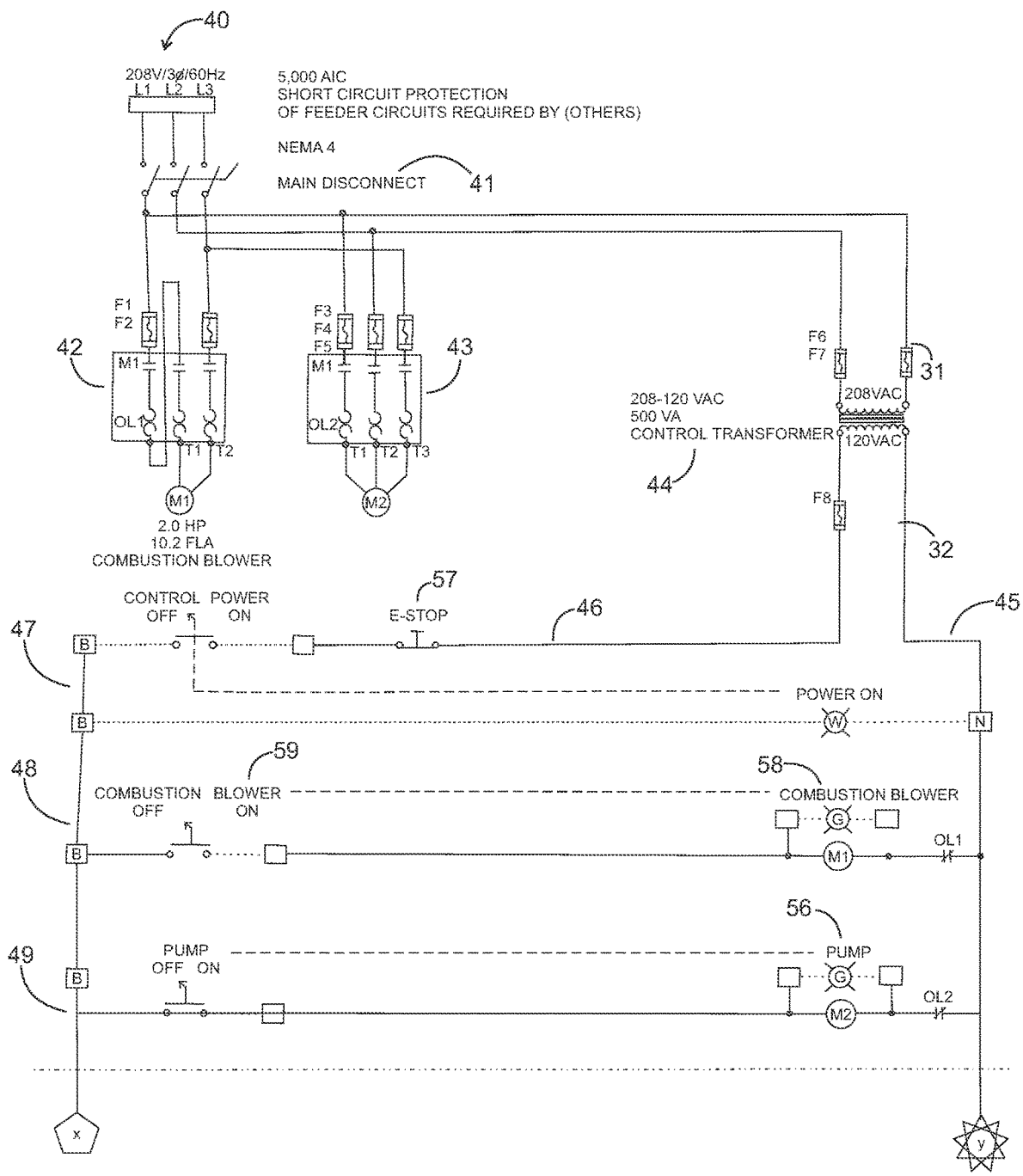
FIG. 1a is a circuit diagram of the present invention.
Figure 1B:
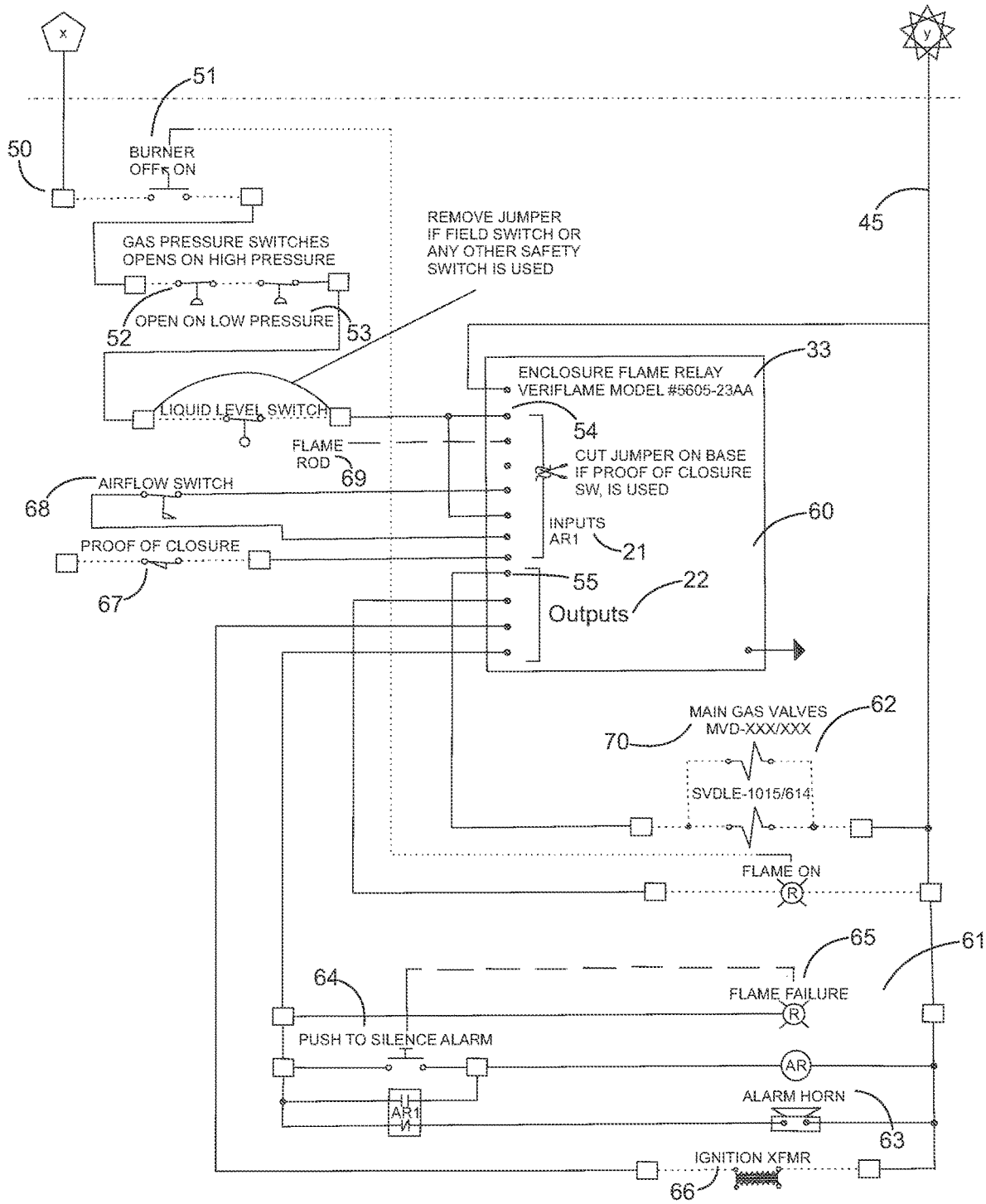
FIG. 1b is a continuation circuit diagram of the present invention from FIG. 1.

As seen in FIG. 1a, the electrical diagram of the present invention is presented is a circuit diagram. The power supply 40 can be a three-phase power supply at 60 hertz and 208 voltage. The power supply 40 is received at a main disconnect 41 which preferably is enclosed in an outdoor gasketed door enclosure for indoor or outdoor use such as a NEMA 4 standard electrical enclosure. The main disconnect 41 can power a first motor power circuit 42 and a second motor power circuit 43. The first motor power circuit 42 powers a combustion blower 58 which can be a two horsepower motor that is preferably rated for 10.2 full load amperage. The combustion blower 58 is preferably a three-phase combustion blower. The second power circuit 43 can power a water pump 56 which is preferably a three-phase water pump.

The main disconnect 41 provides a high-voltage AC side 31 which can be dropped down to a medium voltage AC side 32 having a voltage less than the high-voltage AC side 31. The main voltage AC side can be 120 volts of alternating current provided by a control transformer 44 connected to the high-voltage AC side 31. The medium voltage AC side 32 has a neutral side 45 and a hot side 46. The initial side 45 cooperates with the hot side 46 to actually in control a variety of different circuits.

An emergency stop switch 57 can cut power to a power switch circuit 47. The power switch circuit 47 also has a control power switch that controls a power light indicator. The power switch circuit 47 is in series with the emergency stop switch 57 and thus cuts power to the medium voltage AC side 32 which is the control side of the circuit. A user can press the emergency stop switch 57 to cut power and the emergency stop switch 57 is preferably mounted on the frame 93 or the housing 94. The user can also press the power switch of the power switch circuit 47 which cuts off the power light indicator and the power to the control side of the circuit. The power switch circuit 47 includes a power light indicator.

The control side of the circuit also includes a combustion blower circuit 48 which has a combustion blower switch 59 controlling a combustion blower 58. The combustion blower 58 includes a combustion blower LED light indicator. The combustion blower 58 blows the flame 89 to provide oxygen and control the flame qualities. Additionally, a pump power circuit 49 controls the water pump 56. The water pump 56 includes a water pump LED light indicator in parallel with the water pump to indicate water pump activation. The pump power circuit 49 also includes a pump switch. The water pump pumps water from a fluid reservoir on the carriage 90 so as to provide vaporizing water cooling which prevents the burner enclosure 97 from overheating during use.

The burner control circuit 50 has a burner switch 51. The burner switch 51 is connected to the flame on LED light indicator so that the user can receive an indication of the burner switch 51 status. A first gas pressure switch 52 and a second gas pressure switch 53 operate in conjunction with each other. One of the gas pressure switches opens on high pressure and the other gas pressure switch opens on low-pressure. Using two separate gas pressure switches defines a range of gas pressure where the burner is activated. A liquid level switch is optional and can be bypassed by removing a jumper if other safety is provided. The liquid level switch provides a level of the water tank so that when cooling water is running out, the burner will automatically turn off.

An airflow switch 68 is connected to the main control circuit 60 and activates the blower to provide flame blowing. A closure switch 67 is connected to the main control circuit 60 and can be configured so that it prevents operation when the closure switch is open such as when the main control circuit housing 98 is removed from the frame 93, or such as when the housing 94 is removed from the frame 93. The burner switch 51, the first gas pressure switch 52, and the second gas pressure switch 53 are connected in series to the valve open input 54. The valve open input 54 receives a valve open input signal. The valve open input 54 is received on the main control circuit 60 which can be a part of the low-voltage 33 side of the circuit which could operate on direct current, or low-voltage AC such as 120 volt AC power. The main control circuit 60 is preferably housed in the main control circuit housing 98 which can be mounted to the housing 94. Thus, the medium voltage AC side 32 can be the same as the low-voltage AC, or can be more voltage.

The main control circuit 60 receiving the inputs in the first array AR1 of inputs 21 can then process the inputs through a microprocessor, controller, integrated circuit or the like. The main control circuit 60 provides multiple outputs 22 such as the valve open output 55. The valve open output 55 activates the outlet valve 70 at the main gas valve control circuit 62. The main gas valves are preferably electronically controlled such as the Dungs™ 267071 Single Automatic Shut-off Valves SV 1015/614 which are 120 volt AC powered 50/60 Hz, 45VA and 1½" NPT housed in a NEMA Type 4 housing. The main gas valve control circuit is connected to the neutral side and the main control circuit 60 at the valve open output 55.

A flame failure safety circuit 61 provides an alarm 63 when a flame failure sensor 65 senses a failure. The flame failure sensor 65 activates the alarm horn 63 which can be reset at a push to silence alarm switch 64. The ignition transformer is also activated on the output portion of the main control circuit 60.

A flame rod 69 can produce a flame rod input into the main control circuit 60.

Figure 2:
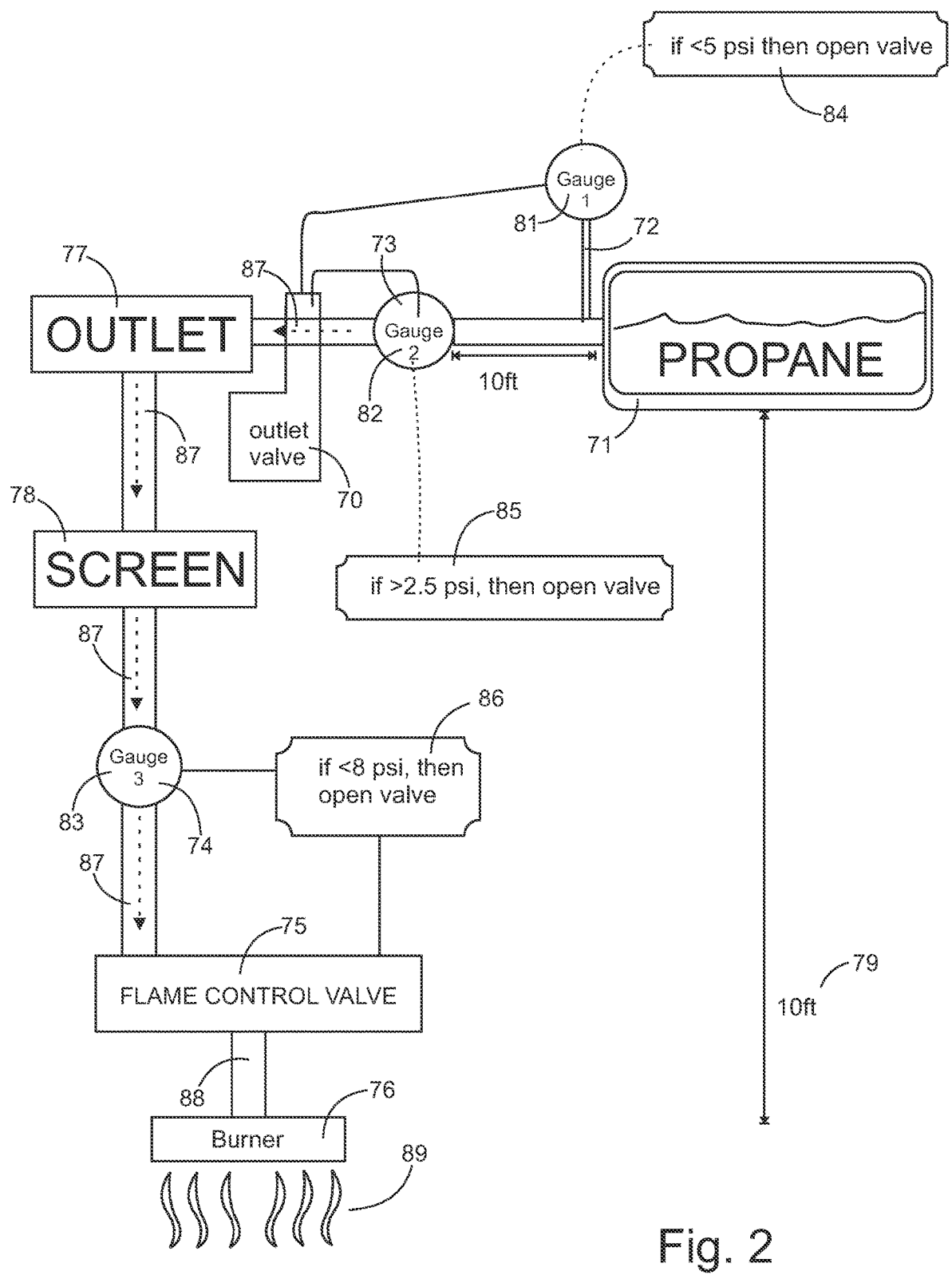
FIG. 2 is fuel system diagram.

As seen in FIG. 2, the propane tank 71 stores propane and delivers propane through an outlet valve 70. The outlet valve 70 is connected to a first gauge 81 and a second gauge 82. The first gauge 81 has a first gauge tap 72 that taps to the propane tank 71. The second gauge 82 has a second image tap 73 that taps to the outlet passage 87 that is upstream of the outlet valve 70. The first gauge 81 is preset to a first gauge control parameter 84 and the second gauge 82 is preset to a second gauge control parameter 85. The first gauge control parameter 84 is preferably open when pressure exceeds a preset amount. Preferably, the pressure open preset amount is less than five psi. When pressure is less than five psi, the first gauge 81 delivers a first gauge open signal to the outlet valve 70, but when the pressure is more than five psi, the first gauge does not deliver the first gauge open signal. The second gauge control parameter 85 is preferably open when the pressure of the outlet passage is greater than 2.5 psi. The outlet passage opens when the pressure of the outlet passage is greater than 2.5 psi. The outlet valve 70 can be made of multiple valve heads having multiple valve gates such as a first valve gate that is connected to the first gauge and a second valve gate that is connected to the second gauge. When the valve gates are connected in series, the conditions of the first gauge control parameter 84 and the second gauge control parameter 85 are combined such that the pressure in the tank and outlet passage are between 5 psi and 2.5 psi. The use of more than one valve head may lead to one valve head being open while one valve is closed. Alternatively, a valve gate system having two gates can be used for the outlet valve 70. This may allow easier detection of the status of the system by monitoring the open or closed nature of each individual valve head of the outlet valve 70. In practical use, it may be easier to use two pressure monitoring control valves to form the outlet valve 70 and mount both of the valves onto the outlet passage since the first gauge 81 has a first gauge tap 82 connected to the propane tank, and the first gauge tap 82 would still be connected to the propane tank if it were connected to the outlet passage 87 immediately at the outlet passage 87 connection to the propane tank.

The outlet passage 87 continues through the outlet 77 and through a screen 78. The screen 78 removes impurities from the flow of propane through the outlet passage 87. The outlet passage length is a minimum of 10 feet such that the propane tank is at least 10 feet away from the burner. The third gauge 83 is mounted between the screen 78, the second gauge 82, and the flame control valve 75. The third gauge 83 controls the flame control valve 75. The third gauge 83 is downstream of the outlet valve 70. The flame control valve 85 has an electrical control connected to it which is a third gauge control parameter 86. The third gauge control parameter 86 is preferably that the measurement of the third gauge is less than 8 psi to open the valve. Although the pressure in the tank is less than 5 psi and the pressure in the outlet passage 87 at the second gauge tap 73 is greater than 2.5 psi, daytime heat and the heat from the burner 76 can increase the pressure of the propane.

Thus, the system has three gauges and two valves with three gauge control parameters. Each of the three gauge control parameters have a preset pressure of the fuel, namely first preset pressure 23, second preset pressure 24, and the third preset pressure 25.

The first gauge 81, and the second gauge 82 control the outlet valve 70, while the third gauge 83 controls the flame control valve 75. The preferred range of the three gauge control parameters are about plus or minus 1 psi of the best modes stated above. The preferred range of the first gauge control parameter 84 is between less than about 4 and 6 psi. The preferred range of the second gauge control parameter 85 is between about greater than 2 psi and 3 psi. The preferred range of the third gauge control parameter 86 is between about less than 7 to 9 psi.

The invention claimed is:

1. A field incinerator comprising:
   a. a carriage having a frame;
   b. a fuel tank mounted to the frame;
   c. an outlet passage extending from the tank;
   d. an outlet valve mounted to the outlet passage, wherein the outlet valve controls the outlet passage;
   e. a first gauge, wherein the first gauge has a first gauge tap, wherein the first gauge tap is connected to the fuel tank or the outlet passage, wherein the first gauge has a first gauge control parameter, wherein the first gauge control parameter requires less than a first set pressure for activation;
   f. a second gauge, wherein the second gauge is connected to the outlet passage downstream from the first gauge, wherein the second gauge has a second gauge control parameter, wherein the second gauge control parameter requires more than a set second pressure for activation wherein the first gauge control parameter and the second gauge control parameter must both be fulfilled for opening the outlet valve;
   g. a third gauge, wherein the third gauge has a third gauge tap that is connected to the outlet passage downstream from the second gauge, wherein the third gauge has a third gauge control parameter;
   h. a flame control valve, wherein the third gauge control parameter requires less than a set third set pressure for activating the flame control valve; and
   i. a burner connected to the flame control valve, wherein the burner is in series with the flame control valve which is in series with the third gauge, outlet valve, second gauge, first gauge, and fuel tank.

2. The field incinerator of claim 1, wherein the set first pressure is between 4 and 6 psi.

3. The field incinerator of claim 1, wherein the set second pressure is between 2 and 3 psi.

4. The field incinerator of claim 1, wherein the set third pressure is between 7 and 9 psi.

5. The field incinerator of claim 1, wherein the set first pressure is 5 psi.

6. The field incinerator of claim 1, wherein the set second pressure is 2.5 psi.

7. The field incinerator of claim 1, wherein the set third pressure is 8 psi.

8. The field incinerator of claim 1, further including a main control circuit having a set of inputs and a set of outputs.

9. The field incinerator of claim 8, wherein the set of inputs includes a flame rod input.

10. The field incinerator of claim 8, further including a flame failure safety circuit with an alarm horn.

11. The field incinerator of claim 8, further including an airflow switch that is configured as an airflow sensor for sensing an airflow of the blower.

12. The field incinerator of claim 8, wherein the set of outputs includes the valve open output, wherein the set of inputs includes a valve open input, wherein the valve open input controls the valve open output.

13. The field incinerator of claim 8, wherein the set first pressure is between 4 and 6 psi, the set second pressure is between 2 and 3 psi, and the set third pressure is between 7 and 9 psi.

14. The field incinerator of claim 8, wherein the first gauge tap and the second gauge tap are at least 10 feet apart.

15. The field incinerator of claim 14, wherein the set first pressure is between 4 and 6 psi.

16. The field incinerator of claim 14, wherein the set second pressure is between 2 and 3 psi.

17. The field incinerator of claim 14, wherein the set third pressure is between 7 and 9 psi.

18. The field incinerator of claim 14, wherein the set first pressure is 5 psi.

19. The field incinerator of claim 14, wherein the set second pressure is 2.5 psi.

20. The field incinerator of claim 14, wherein the set third pressure is 8 psi.

* * * * *